_Patented Mar. 31, 1936_ 2,035,484

UNITED STATES PATENT OFFICE 2,035,484

COMPOSITION OF MATTER, PROCESS FOR ITS PRODUCTION AND FOR ITS USE IN THE PREPARATION OF FERTILIZERS

Walter H. Kniskern, Prince George County, Va., and Charles K. Lawrence, Syracuse, N. Y., assignors to Atmospheric Nitrogen Corporation, New York, N. Y., a corporation of New York No Drawing. Application May 23, 1932, Serial No. 613,140

6 Claims. (Cl. 71—9)

This invention relates to a sodium nitrate-ammonia composition, to a process for its preparation and to a method for the transportation of sodium nitrate and ammonia in the form of a new composition of matter and the use of this composition in the production of fertilizers.

The extent of the fixation of atmospheric nitrogen as ammonia and as sodium nitrate and the production of sodium nitrate by oxidation of synthetic ammonia and absorption in solutions of sodium carbonate or caustic soda makes available from this source large amounts of both ammonia and sodium nitrate for industrial purposes, particularly for the production of fertilizers. The production and transportation of ammonia in the form of liquid ammonia and of sodium nitrate as a substantially dry crystalline salt are attended by difficulties and expensive operations due to the high vapor pressure of liquid ammonia at ordinary temperatures and, with respect to the sodium nitrate, to the costs of evaporating all the water from the solutions of sodium nitrate obtained in the processes for its production.

It is frequently desirable to prepare fertilizers from solid acidic fertilizer materials, particularly from phosphate materials such as superphosphate which contain nitrogen as well as $P_2O_5$. It has been proposed to obtain such a fertilizer by treating a superphosphate with ammonia. For certain purposes, however, it is desirable to have a fertilizer containing more nitrogen than may thus be obtained by ammoniating the superphosphate.

It is accordingly an object of this invention to provide a composition of matter which comprises both sodium nitrate and ammonia, and a process for its economical production and ready transportation. Another object of the invention is to provide a process for the production of phosphate fertilizers containing an increased proportion of nitrogen, by treating a mono-calcium acid phosphate material, for example, superphosphate, triple superphosphate, or mixtures containing the same, with a liquid composition comprising sodium nitrate and ammonia.

While sodium nitrate is quite soluble in water so that even at 0° C., an aqueous solution may be obtained which contains about 42% sodium nitrate by weight, as ammonia is dissolved in water the solubility of the sodium nitrate in the ammoniacal solution decreases. We have discovered, however, that while this decreasing solubility with increasing amounts of ammonia dissolved in aqueous solutions of sodium nitrate holds true for solutions containing ratios of ammonia to water of up to about three parts of ammonia to seven parts water, with increased proportions of ammonia the solubility of the sodium nitrate no longer decreases, but as a result of an abrupt change in the direction of the solubility curve, the solubility at 0° C. of the sodium nitrate in water containing about four parts or more of ammonia for every six parts of water increases with increasing proportions of ammonia. For example, substantially as much sodium nitrate may be dissolved in a liquor containing 65% ammonia and 35% water as may be dissolved in pure water, and as the ammonia content of the liquor is increased, the solubility of the sodium nitrate increases still further, so that at 0° C. sodium nitrate may be dissolved in a liquid containing 10% or less of water to obtain a liquid product containing from about 52% to 56% by weight of sodium nitrate. Ammoniacal solutions of sodium nitrate which are substantially saturated with sodium nitrate at a temperature below about 30° C. and preferably at a temperature within the range of about —30° C. to 30° C., are particularly suitable for shipment and use in the production of fertilizers in accordance with this invention.

The ammoniacal solutions of sodium nitrate containing not less than about four parts of ammonia for every six parts of water are peculiarly suitable for shipment and use in the production of fertilizers. The ratio of nitrate nitrogen to ammonia nitrogen carried in these solutions remains substantially constant for saturated solutions at a given temperature. For example, for solutions saturated with sodium nitrate at 0° C. and also at 30° C. the ratio of nitrate to ammonia nitrogen remains within the range of about .22 to .28 as the proportions of water to ammonia are varied from six parts water to four parts of ammonia up to liquid ammonia containing substantially no water. As a result of this property of the solutions of this invention, a composition suitable for fertilizer production in which the ratio of nitrate to ammonia nitrogen is substantially constant, may be prepared with a wide variation in the proportion of water present. The water content of the sodium nitrate ammonia liquor may therefore be varied to compensate for a varying water content of superphosphate materials to which the solution is added and thus enables one to produce a fertilizer product having satisfactory physical properties.

Again the solubility of sodium nitrate in the ammoniacal liquors changes comparatively little with changes in temperature within the range of 0° C. to 30° C. For example, the solubility of sodium nitrate in an aqueous solution of ammonia containing 6.5 parts of ammonia to 3.5 parts of water varies from about 42% at 0° C. to about 47% at 30° C. This property of these solutions makes it possible to prepare a solution substantially saturated with sodium nitrate at a temperature, for example, below about 20° C. which may be shipped, and under the influences of changing atmospheric temperature conditions will not throw down a precipitate of solid sodium nitrate, or if some precipitation should occur at extremely low temperatures such as may occur in the winter time, the precipitated sodium nitrate may be redissolved by a slight warming of the liquor. The solutions of this invention accordingly present no difficulties in their handling and thorough dissemination throughout the material to be treated with them such as might be caused by the crystallization of solid material from the solutions under the ordinary operating conditions. The solutions lend themselves to being sprayed through ordinary spray devices without disadvantageous clogging of the sprayer.

Furthermore these solutions may be economically prepared, stored and transported. The presence of the sodium nitrate lowers the vapor pressure of the ammonia as compared with solutions of ammonia and water having a similar ratio of these two constituents or with liquid anhydrous ammonia. I have also found that no special corrosion problem is involved in the handling of the solutions of this invention so that no special or new type of container is necessary.

The solutions of this invention may be conveniently prepared, for example, by introducing ammonia as a gas or liquid anhydrous or concentrated aqua ammonia into a solution or slurry of sodium nitrate or by dissolving solid sodium nitrate containing more or less water in liquid ammonia or a solution of ammonia in water of a suitable composition. These solutions may be particularly advantageously prepared from the liquid anhydrous ammonia or concentrated aqua ammonia liquors obtained from a synthetic ammonia process and the solutions of sodium nitrate obtained by absorbing nitrogen oxides in sodium carbonate solutions. If desired, gaseous or anhydrous liquid ammonia or concentrated aqua ammonia may be introduced into the solution of sodium nitrate obtained by the absorption of nitrogen oxides in sodium carbonate solution or this sodium nitrate solution may, if desired, be evaporated to drive off more or less of its water content before being treated with the ammonia. Again the sodium nitrate liquor may be concentrated to crystallize out sodium nitrate and the crystalline product filtered off and without a special drying treatment be dissolved in liquid ammonia or relatively concentrated solutions of ammonia in water.

The production of the ammonia-sodium nitrate liquors of this invention is particularly adapted to the fixed nitrogen industry wherein both ammonia and sodium nitrate are produced in the same plant. Both of these products may be shipped to the trade as a single homogeneous liquid.

The following examples are illustrative of methods for the preparation of the sodium nitrate ammonia composition of this invention and of its use in the production of fertilizers, but the invention is not limited to these examples or to the particular details described.

*Example 1.*—A substantially anhydrous liquid composition may be prepared by dissolving about 55 parts of dry solid sodium nitrate in 45 parts of liquid anhydrous ammonia. This composition has a vapor pressure at 20° C. of somewhat less than 5 atmospheres absolute as compared with a vapor pressure of ammonia at the same temperature of 8.5 atmospheres absolute. Solid sodium nitrate does not crystallize out from this solution at temperatures above about −10° C. The ratio of nitrate nitrogen to ammonia nitrogen in the composition of this example is about 0.24.

*Example 2.*—A composition containing sodium nitrate, ammonia and water may be prepared by mixing about 52.5 parts of dry solid sodium nitrate with 47.5 parts of liquid anhydrous ammonia. To this mixture may then be added about 22 parts of water for each 100 parts of the mixture to produce a product containing 68 parts of ammonia for every 32 parts of water and about 1.1 parts of sodium nitrate for each one part by weight of ammonia. The ratio of nitrate nitrogen to ammonia nitrogen in this composition is about 0.22. The composition has a vapor pressure which is only about 60% of the vapor pressure of a 68% aqua ammonia, which has a composition with respect to ammonia and water corresponding to the composition of the sodium nitrate-ammonia-water composition of this example.

A composition similar to the above may be prepared by adding 47.5 parts of anhydrous liquid ammonia to a slurry of sodium nitrate and water containing 52.5 parts of sodium nitrate to 22 parts of water. This slurry may be prepared by concentrating a solution of sodium nitrate in water.

The solutions of Examples 1 and 2 may be utilized for the production of a fertilizer by mixing the desired proportion of the solutions with superphosphate or triple superhposphate.

*Example 3.*—A solution of about 83.5 parts of sodium nitrate in 68.5 parts of anhydrous liquid ammonia is prepared and utilized in the preparation of a fertilizer by rapidly spraying the solution onto superphosphate while the superphosphate is being agitated in a rotating mixer. The superphosphate may contain about 9% water and be treated with the sodium nitrate ammonia solution in the proportions of about 2,000 parts of the superphosphate to 152 parts of the sodium nitrate-ammonia solution. The temperature of the mixture rises due to the liberation of heat as a result of the chemical reactions which take place. The resulting mixtures is in excellent physical condition immediately after addition of the sodium nitrate-ammonia solution and retains its good physical condition, when allowed to cool to ordinary temperatures. The ratio of nitrate nitrogen to ammonia nitrogen, both in the sodium nitrate-ammonia composition mixed with the superphosphate and in the fertilizer product thus obtained is about 0.24.

*Example 4.*—About 87 parts of sodium nitrate are dissolved in a solution of about 69.5 parts of ammonia in 36.5 parts of water. About 193 parts of this solution are added to 2,000 parts of superphosphate in the manner described in Example 3. The product thus obtained is in excellent physical condition and contains nitrate nitrogen and ammonia nitrogen in the ratio of about 0.22.

If desired, addition materials such as calcium nitrate, ammonium nitrate, ammonium phosphate, ammonium sulfate, etc. or any two or more of these materials, which, in themselves, are valuable fertilizers, may be incorporated with the sodium nitrate-ammonia solutions before they are added to the phosphate material or they may be incorporated with the phosphate material before or after the treatment with the sodium nitrate-ammonia liquor.

We claim:

1. As a new composition of matter a liquid comprising ammonia and water in the proportions of not less than about 4 parts of ammonia for every 6 parts of water, and substantially saturated at a temperature below about 30° C. with sodium nitrate.

2. As a new composition of matter a liquid comprising ammonia and water in the proportions of not less than about 4 parts of ammonia for every 6 parts of water, and substantially saturated at a temperature within the range of about −30° C. to 30° C. with sodium nitrate.

3. The process for the production of a sodium nitrate ammonia composition suitable for the production of fertilizers from an aqueous solution of sodium nitrate and liquid ammonia which comprises concentrating said solution until the ratio of water to sodium nitrate is not greater than about 3 to 7 and introducing ammonia into the product thus produced in amount sufficient to form a composition containing not less than about 4 parts of ammonia for every 6 parts of water and substantially saturated at a temperature below about 30° C. with sodium nitrate.

4. A process for producing a fertilizer which comprises mixing a solid acidic fertilizer material with an ammoniacal solution of sodium nitrate containing not less than about 4 parts of ammonia for every 6 parts of water and substantially saturated at a temperature below about 30° C. with the sodium nitrate.

5. A process for producing a fertilizer which comprises mixing a superphosphate material with an ammoniacal solution of sodium nitrate containing not less than about 4 parts of ammonia for every 6 parts of water and substantially saturated at a temperature below about 30° C. with the sodium nitrate.

6. A process for producing a fertilizer which comprises mixing with superphosphate an ammoniacal solution of sodium nitrate containing not less than about 4 parts of ammonia for every 6 parts of water and substantially saturated at a temperature within the range of about −30° C. to 30° C. with the sodium nitrate.

WALTER H. KNISKERN.
CHARLES K. LAWRENCE.